UNITED STATES PATENT OFFICE.

EUGENE E. AYRES, JR., OF CHESTER, PENNSYLVANIA, ASSIGNOR TO SHARPLES SPECIALTY COMPANY, OF WEST CHESTER, PENNSYLVANIA, A CORPORATION OF PENNSYLVANIA.

PROCESS FOR REFINING LIQUIDS.

1,297,635.   Specification of Letters Patent.   Patented Mar. 18, 1919.

No Drawing.   Application filed October 3, 1917.   Serial No. 194,482.

*To all whom it may concern:*

Be it known that I, EUGENE E. AYRES, Jr., a citizen of the United States, residing at Chester, in the county of Delaware and State of Pennsylvania, have invented a new and useful Process for Refining Liquids, of which the following is a specification.

My process for refining liquids is designed especially for the separation of solids or semi-solids therefrom, as, for instance, the clarification of varnishes, oils, fruit juices, or other liquids containing solids, particularly those of specific gravities but slightly different from the specific gravities of the liquids in which they are contained.

Where it is desirable to remove very small particles from liquids, particularly where the substances to be separated vary very slightly in specific gravity, the separation commercially has frequently been impracticable by known means, and it is an object of my invention to effect such separation economically and efficiently without objectionably affecting the substance to be clarified or refined.

I have found that this object can be attained in many instances by adding an inert material to substances to be separated and effecting the desired separation thereby, with the aid of centrifugation accompanied in certain cases with various treatments depending on the character of the substances to be separated.

The inert substance should be relatively heavy or of a nature permitting it to be completely separated, together with the substance enmeshed, adsorbed or coagulated therewith, by centrifugal force.

In the clarification of varnish, for instance, I have used successfully, as an enmeshing agent, infusorial earth or kieselguhr. In this treatment, the varnish is heated to a temperature of about 160 degrees F. and kieselguhr, in amount equal to one-half of one per cent. of the volume thereof, in the form of a paste made by admixture with varnish, is stirred into the heated varnish. The stirring of the mixture should be effected thoroughly, by a continuation thereof for say five minutes or more, and thereafter the mixture allowed to settle, say for one or two hours. It is advantageous to permit most of the kieselguhr together with the matter enmeshed thereby to settle to the bottom of the container, thus effecting the separation of much of the matter to be removed, and subject the supernatant liquid to centrifugation, because the kieselguhr particles are only loosely united with the particles of varnish sediment and this union may be broken to a greater or less degree by centrifugation, the preliminary separation by settling reducing the refining operation otherwise left for the centrifugal operation and effecting superior results.

In the clarification of cloudy bullion, as a further illustration, I have obtained highly satisfactory results by adding to the same, when raised in temperature to boiling, one-fifth of one per cent. by weight of egg white and passing the product through a centrifugal machine. The liquid to which this albumin is added should have a temperature above that required for coagulating such albumin, which must be added at a temperature below that required for coagulation. The result of the combination is that the albumin is coagulated by the comparatively high temperature, which may be advantageously maintained for some time to effect complete coagulation, and incloses the suspended sediment, the resulting particles being sufficiently heavy to be removed readily by centrifugal force.

In the clarification of oil, as a still further illustration, if cloudy oil, such as dirty benzin, free of water, has mixed therewith one per cent. of its weight of fullers' earth, particles suspended in the oil are adsorbed and immediate efficient clarification of the resulting product can be obtained by passing it through a centrifugal machine.

It will be understood that the centrifugation is intended to effect separation by reason of the difference in the specific gravity of the liquid to be clarified and the inert matter mechanically combined with the particles to be removed from the liquid thereby, the materials under treatment being divided into layers by the centrifugal action and then separated by decantation or flowing one from the other.

Having described my invention, I claim:

1. The process of refining liquid which consists in adding to the same an inert substance capable of carrying down matter suspended in said liquid and separating the mixture into layers by centrifugation.

2. The process of refining liquid containing solid particles which consists in adding to the same a substance of specific gravity different from that of said liquid capable of combining mechanically with said particles, subjecting the product to centrifugation, effecting the separation of a layer of clarified liquid and flowing off said clarified liquid.

3. The process of refining liquid containing solid particles which consists in adding to the same an inert substance of greater specific gravity than that of said liquid, settling the product, separating the supernatant liquid therefrom, centrifugating said supernatant liquid so as to effect the separation therefrom of a layer containing remaining solid matter to be removed and flowing off the finally clarified liquid.

4. The process of refining liquid containing solids to be removed therefrom, which consists in heating and adding to the same an inert substance adapted for combining with said solids and separating the product into layers by centrifugal action.

In testimony whereof I have hereunto set my name this 1st day of October, 1917.

EUGENE E. AYRES, Jr.